W. ARTER.
VERTICAL SHAFT AND BEARING THEREFOR.
APPLICATION FILED APR. 24, 1916.
1,289,358.
Patented Dec. 31, 1918.
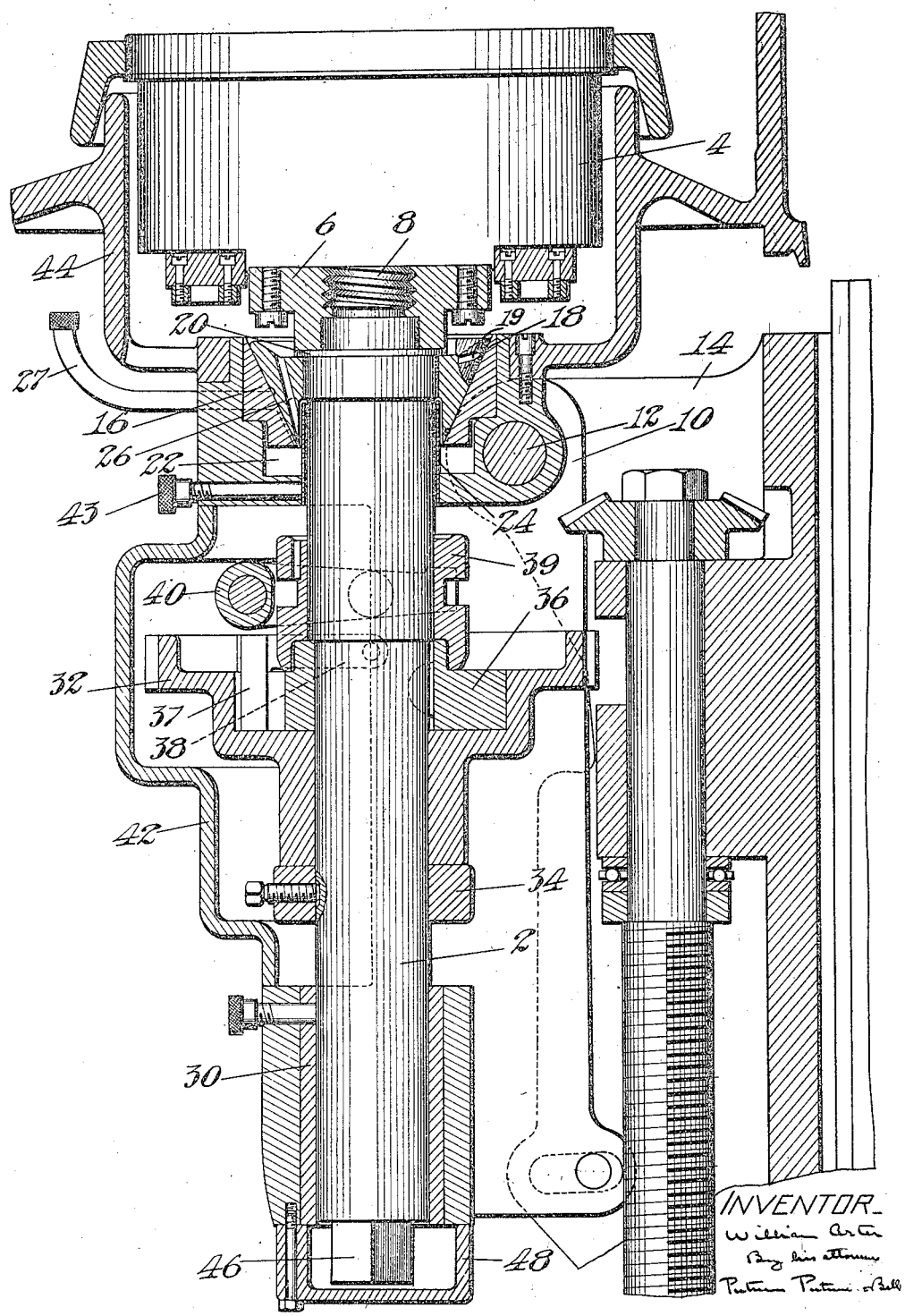

UNITED STATES PATENT OFFICE.

WILLIAM ARTER, OF WORCESTER, MASSACHUSETTS, ASSIGNOR TO THE PERSONS-ARTER MACHINE COMPANY, OF WORCESTER, MASSACHUSETTS, A CORPORATION OF MASSACHUSETTS.

VERTICAL SHAFT AND BEARING THEREFOR.

1,289,358.                   Specification of Letters Patent.    Patented Dec. 31, 1918.

Application filed April 24, 1916. Serial No. 93,281.

*To all whom it may concern:*

Be it known that I, WILLIAM ARTER, a subject of the King of Great Britain, residing at 540 Salisbury street, Worcester, in the county of Worcester and State of Massachusetts, have invented certain Improvements in Vertical Shafts and Bearings Therefor, of which the following description, in connection with the accompanying drawings, is a specification, like reference characters on the drawings indicating like parts in the several figures.

This invention relates to the vertical chuck shafts of grinding machines and similar machine tools, and to the bearings for supporting such shafts. The peculiar service required of machines of this type makes it very essential that the shaft on which the chuck or similar device is mounted, shall run very smoothly without any play or lost motion as the grinding wheel or other tool moves into and out of contact with the work; and that the shaft shall not develop such play as it, or the bearing supporting it, becomes worn. The present invention aims to devise a bearing for such shafts which will give the service demanded in practice of mechanisms of this character and will require but very little care or attention. Stating more specifically, the invention aims to devise a bearing construction for a shaft of the character indicated which will enable the shaft to run smoothly without play or lost motion, will maintain the bearing surfaces well lubricated, and will maintain the shaft in alinement over a very long period of service.

The chucks used in machines of this character are so mounted on the shafts that support them, and ordinarily are so inclosed, that it usually is very difficult to remove them. The present invention aims to overcome this difficulty also and to devise means by which a chuck of the character used in these machines can be readily removed from the shaft on which it is mounted.

The invention will be readily understood from the following description of the embodiment thereof at present preferred, and the novel features will be pointed out in the appended claims. The single figure of the accompanying drawing is a vertical, central, sectional view of a bearing mechanism for a vertical chuck shaft, showing these parts constructed in accordance with the present invention.

Referring now to the drawing, 2 indicates a vertical shaft mounted to rotate in suitable bearings and supporting a magnetic chuck 4 on its upper end. The work, of course, is placed on the upper face of this chuck. Bolted to the lower part of the chuck is a base plate 6, having a screw threaded hole therein to receive a threaded extension 8 formed on the upper end of the shaft 2.

The support for this shaft comprises a bearing bracket, or yoke 10, mounted on a pivot pin 12 that is supported in a slide 14 which is adjustable in vertical ways by means of a suitable elevated mechanism, as will be readily understood by those skilled in this art. The bearing bracket 10, is, of course, adjustable about the pivot 12 to vary the angle of the work supporting face of the chuck 4 as may be required by the work. A seat is formed in the upper end of the bracket 10 to receive a bearing bushing 16 having a tapered or conical bore that constitutes its bearing surface. This bushing preferably is forced into its seat and thus is held in a stationary position. A second bearing member 18 is mounted fast on the shaft 2 just under an enlargement 20 formed on said shaft so that the member 18 supports the entire weight of the shaft and the chuck. This member consists of a collar having a tapered or conical peripheral bearing face fitting in the bearing surface of the bushing 16 so that it can rotate freely in the bushing.

In order to supply the coöperating bearing surfaces of the members 16 and 18 with oil, a novel construction is provided which maintains the lower portions of these bearing surfaces submerged in or flooded with oil. The upper part of the bracket 10 is chambered, as indicated at 22, and a sleeve 24 is forced tightly into the opening in the bracket 10, at a point below the bearing members 16 and 18, so that it encircles the shaft. This sleeve coöperates with the adjacent chambered parts of the bracket 10 to form an oil well or pocket 22; and it extends upwardly between the shaft 2 and the conical bearing collar 18, into a space formed between them for this purpose, to a height considerably above the lower ends of the cooperating bearing surfaces of the parts 16 and 18. Consequently the oil well thus formed is of sufficient height to maintain the lower portions of the bearing surfaces of the parts 16 and 18 submerged in oil. The rotative movement of the part 18, of course, tends to carry the oil upwardly between the surfaces of the two parts 16 and 18 through centrifugal action and thus maintain the entire bearing surfaces well lubricated at all times. In order to facilitate the flow of oil upwardly between the friction surfaces of the bushing 16 and collar 18, the collar has a spiral groove formed in its surface, as indicated at 19, that tends to drive the oil upwardly to the upper end of the bearing collar 18. Here the oil overflows into a depression or pocket formed in the upper end of the collar, and flows back again into the oil well through a plurality of ducts 26 which are drilled downwardly through the collar, as clearly shown in the drawings.

The space between the shaft 2 and the collar 18, into which the upper part of the sleeve 24 projects, need be merely of sufficient width to provide the necessary clearance between the walls of the sleeve 24 and the rotating parts 2 and 18. This sleeve forms really an oil dam that prevents the oil contained in the chamber 22 from flowing to the shaft. Oil may be supplied to the oil well 22 through a tube 27 which discharges into a groove that is formed in the bearing face of the bushing 16 and leads to the well 22.

The lower end of the shaft 2 is steadied by a guide bearing 30 consisting of a bushing made of any suitable bearing material, mounted in the lower portion of the bearing bracket 10. This lower bearing, being cylindrical in form, merely steadies or guides the lower end of the shaft and maintains it in alinement with the axis of the conical bearing surfaces of the members 16 and 18. The latter members, however, support the weight of the shaft and the parts which it carries. It will be observed that as the bearing members 16 and 18 wear, the shaft will merely be allowed to settle slightly, but its axial alinement with the bearing 30 will not be disturbed. A bearing construction of this kind, therefore, prevents any lost motion or play in the shaft 2 as the bearings become worn, and the lubricating system provided reduces the rate of wear to a minimum.

In assembling the parts of this mechanism the bushings 16 and 30 may be accurately alined by reaming them both from the same arbor; or if preferred, the seat for the bushing 16 may be reamed instead of reaming the bearing face of the bushing, this bushing and the collar 18 being made very accurately before being seated.

Any convenient means may be employed for driving the shaft 2. The arrangement shown consists of a spiral gear 32 supported loosely on the shaft 2 by means of a collar 34. An expanding clutch member 36, keyed to the shaft 2, is positioned in a socket or seat formed for it in the upper face of the hub of the gear 32, where it may be expanded into driving engagement with the gear by means of two pins, one of which is indicated at 37, carried by pivoted arms 38 which are arranged to be operated by a sleeve 39 mounted to slide on the shaft 2 just above the clutch 36. Clutch operating lever 40 is connected with the sleeve 39 to move it up and down. The downward movement of this sleeve forces the beveled ends of the pins 37 against the opposite end faces of the clutch member 36 and spreads them apart, thus expanding the part 36 until it is locked firmly to the gear 32. A spring (not shown) connects the ends of the part 36 and moves them toward each other to contract the part 36 when the sleeve 39 is lifted, thus interrupting the driving engagement between the shaft and the gear 32. The gear 32 and the parts adjacent thereto, are inclosed by a cover plate or casing 42 that fits snugly into the recess in the front of the bearing bracket 10 and coöperates with the bearing bracket to inclose the two sides and front of the shaft 2, and the driving parts therefor.

Any oil that overflows the dam or sleeve 24 finds its way down the shaft 2 and lubricates the clutch parts and the gear 32. An oil tube 43 also is provided through which additional lubricating material may be introduced for the purpose of lubricating more directly the driving mechanism for the shaft.

The chucks used in machines of this type are usually screw threaded on the shaft on which they are supported, as in the construction shown in the drawings. The direction of this thread is so related to the direction of rotation of the chuck that the drag of the work tends to seat the chuck very tightly on the thread. Consequently it is often found that the chuck is screwed so tightly on the shaft that it is very difficult indeed to "start the thread," that is, to initiate the unscrewing operation, particularly since these chucks usually are inclosed by a water pan 44 which renders access to the chuck more difficult than otherwise would be the case. Furthermore, magnetic chucks, as usually constructed, cannot be drilled and are not shaped to receive special tools by which they can be removed. In order to facilitate the removal of chucks of this kind, and also for the purpose of avoiding the necessity of removing the water pan or other parts that inclose the chuck, the shaft 2 is shaped to receive a wrench or other tool by which it can be given a sudden turning movement in the direction opposite to that which it is normally driven, and which will serve to start the unthreading operation. In the construction shown the lower end of the shaft 2 is squared, as indicated at 46, and a removable cap 48 normally protects this squared part. When it is desired to remove the chuck the cap 48 is removed, a large wrench is placed on the squared portion 46, and the handle of this wrench is then struck a sharp blow with a sledge hammer in a direction tending to turn the shaft in the direction opposite to its normal direction of rotation. The chuck 4, of course, is very heavy and a blow delivered to the shaft in this manner is sufficient to start the thread, after which the chuck can easily be unscrewed and lifted off the shaft.

While I have shown and described the embodiment of this invention now preferred by me, it is obvious that this embodiment is susceptible of considerable modification while still retaining its essential characteristics and without departing from the spirit or scope of this invention.

Having thus described my invention, what I claim as new and desire to secure by Letters Patent of the United States is:

1. A mechanism of the character described, having, in combination, a vertical rotary shaft, a bearing collar fast on said shaft and having a conical peripheral surface, a bearing bushing having a conical bearing surface fitting the bearing surface of said collar and supporting said collar for rotative movement about the axis of said shaft, a support for said bushing, parts forming an oil well of sufficient height to maintain portions of the coöperating bearing surfaces of said collar and bushing flooded with oil, said collar having a depression formed in its upper face to receive oil forced upwardly between said bearing surfaces, and a duct formed in said collar to conduct oil from said depression into said oil well.

2. A mechanism of the character described, having, in combination, a bearing bracket, a bearing bushing seated in said bracket and provided with a conical bearing surface, a vertical shaft extending through said bracket and bushing, a bearing collar separate from said shaft but fixed thereon and having a conical bearing surface fitting the bearing surface of said bushing, said bushing and collar supporting said shaft for rotative movement about its axis, an oil chamber in said bracket below said collar, said collar being shaped to provide a thin annular space between the lower portion thereof and the periphery of said shaft, a sleeve supported in said bracket and having its upper end positioned in said annular space, said sleeve coöperating with said chamber to form an oil well into which the lower portion of the bearing surfaces of said collar and bushing project, and a guide bearing for said shaft positioned below said bearing bushing and in axial alinement therewith.

3. A mechanism of the character described, having, in combination, a support, a bearing bracket mounted on said support for angular adjustment relatively thereto, a vertical shaft, a pair of conical bearing members supporting said shaft near its upper end for rotative movement about its axis, one of said members being supported by said bracket and the other member being fast on said shaft, a guide bearing for the lower part of said shaft, a driving member for rotating said shaft, and clutch means for controlling the driving connection between said driving member and said shaft.

4. A mechanism of the character described, having, in combination, a support, a bearing bracket pivotally mounted on said support for angular adjustment relatively thereto, a vertical shaft, and a pair of conical bearing members supporting said shaft near its upper end for rotative movement about its axis, one of said members being supported by said bracket and the other member being fast on said shaft.

5. A mechanism of the character described, having in combination, a vertical slide, a bearing bracket mounted on said slide for angular adjustment relatively thereto, a vertical shaft supported by said bracket, a pair of coöperating conical bearing members supporting said shaft near its upper end, a guide bearing in said bracket for the lower part of said shaft, and means located between said bearings for rotating said shaft.

In testimony whereof I have signed my name to this specification in the presence of two subscribing witnesses.

WILLIAM ARTER.

Witnesses:
JAMES GREEN,
LAWRENCE EWING.